US009262876B2

(12) United States Patent
Wood et al.

(10) Patent No.: US 9,262,876 B2
(45) Date of Patent: Feb. 16, 2016

(54) METHOD FOR CONTROLLING FRAUD AND ENHANCING SECURITY AND PRIVACY BY USING PERSONAL HYBRID CARD

(76) Inventors: Richard Glee Wood, Houston, TX (US); Christine Taunya Wood, Houston, TX (US); Wesley Jack White, Jr., Spring, TX (US)

(*) Notice: Subject to any disclaimer, the term of this patent is extended or adjusted under 35 U.S.C. 154(b) by 0 days.

(21) Appl. No.: 11/391,519

(22) Filed: Mar. 28, 2006

(65) Prior Publication Data

US 2006/0184801 A1      Aug. 17, 2006

Related U.S. Application Data

(63) Continuation-in-part of application No. 10/443,382, filed on May 22, 2003, now Pat. No. 7,047,204, which is a continuation-in-part of application No. 10/428,213, filed on May 2, 2003, now Pat. No. 6,820,059.

(60) Provisional application No. 60/461,226, filed on Apr. 8, 2003.

(51) Int. Cl.
| | |
|---|---|
| *H04L 29/06* | (2006.01) |
| *G07C 9/00* | (2006.01) |
| *G06F 21/00* | (2013.01) |
| *G06F 7/04* | (2006.01) |
| *G06F 17/30* | (2006.01) |
| *H04L 9/32* | (2006.01) |
| *G06K 9/00* | (2006.01) |

(52) U.S. Cl.
CPC ......... *G07C 9/00031* (2013.01); *H04L 63/0861* (2013.01)

(58) Field of Classification Search
USPC .............. 713/186; 726/4, 5, 19; 382/115; 340/5.52; 235/487
See application file for complete search history.

(56) References Cited

U.S. PATENT DOCUMENTS

| | | | | |
|---|---|---|---|---|
| 5,895,909 | A  * | 4/1999 | Yoshida ................. | 235/487 |
| 6,011,858 | A  * | 1/2000 | Stock et al. ............ | 382/115 |
| 6,629,591 | B1 * | 10/2003 | Griswold et al. ...... | 194/205 |
| 7,162,058 | B2 * | 1/2007 | Mimura et al. ........ | 382/124 |

(Continued)

OTHER PUBLICATIONS

Khan et al. "Strong Authentication of Remote Users over Insecure Networks by Using Fingerprint-biometric and Smart Cards", Proc. of SPIE vol. 6202 (2006).*

(Continued)

*Primary Examiner* — Shin-Hon Chen

(57) ABSTRACT

A method for controlling fraud using a personal hybrid card and a verification process is disclosed. The method includes registering personal information of an individual in a database forming a registered account for the individual, and assigning a personal hybrid card to the individual with the registered account. The personal hybrid card includes a data storage and a copy of the personal information, including first biometric data stored in the data storage. The method continues by verifying, at an access point, that the individual with the personal hybrid card matches the first biometric data of the individual, that is stored on the personal hybrid card. Next, the individual's personal information is transmitted from the access point to the database for requesting verification of the individual to use the personal hybrid card, and receiving eligibility verification or denial of the individual for accessing services, benefits, programs, and combinations thereof.

22 Claims, 2 Drawing Sheets

(56) References Cited

U.S. PATENT DOCUMENTS

| | | | |
|---|---|---|---|
| 7,689,833 B2* | 3/2010 | Lange | 713/186 |
| 2002/0091937 A1* | 7/2002 | Ortiz | 713/200 |
| 2004/0052405 A1* | 3/2004 | Walfridsson | 382/115 |
| 2004/0059923 A1* | 3/2004 | ShamRao | 713/186 |
| 2005/0005172 A1* | 1/2005 | Haala | 713/202 |
| 2006/0213986 A1* | 9/2006 | Register et al. | 235/382.5 |

OTHER PUBLICATIONS

Sausner, "Biometric: SmartMetric Points to a New World of Verification", Bank Technology News. Jul. 2006, vol. 19 Issue 7, p. 13.*

* cited by examiner

METHOD FOR CONTROLLING FRAUD AND ENHANCING SECURITY AND PRIVACY BY USING PERSONAL HYBRID CARD

CROSS REFERENCE TO RELATED APPLICATIONS

This application is a continuation-in-part of co-pending U.S. patent application Ser. No. 10/443,382 filed on May 22, 2003, and co-pending U.S. patent application Ser. No. 10/428,213 filed on May 2, 2003, which claim priority to provisional U.S. Patent Application Ser. No. 60/461,226 filed on Apr. 8, 2003, entitled "Method for Reducing Fraud in Government Benefit Programs Using a Smart Card", all of which are incorporated herein by reference.

FIELD

The embodiments of the method relate generally to controlling fraud and enhancing security and privacy by using a personal hybrid card for identity authentication and eligibility verification.

BACKGROUND

Publicly and privately sponsored providers of benefits, services, and other programs have concerns wherein individuals can fraudulently access and use the provider's programs. These concerns regarding fraudulent access and use, such as individuals receiving benefits or funds belonging to another individual or accessing a facility or highly secured area by fraudulently using another's access card, can create confusion and render a magnitude of costs for the provider in correcting and managing the fraudulent acts.

Improvements regarding security access of public and private facilities and agencies, such as airports, educational institutions, and other secured facilities can be accomplished through the use of smart cards for accessing databases, which can identify and verify that certain individuals are who they claim to be. Similar mechanisms regarding identity and verification of identity can be used by the banking industry for financial transactions.

A need exists for a method that provides control and management of fraudulent access and use of private and public programs, services, benefits, funding, secured areas, secured facilities, and secured entries by using a personal hybrid card for a verification process involving an individual's identity authentication and an individual's eligibility to use the personal hybrid card for accessing the programs, services, benefits, secured areas, secured facilities, and secured entries, and providing privacy.

A need exists for a method that can enhance security and privacy and reduce the magnitude of costs involved in reviewing and determining requests for access or use of a private program, a public program, a benefit, a service, a facility, a secured area, or a secured entry.

The embodiments meet these needs.

SUMMARY

The embodiments relate generally to a method for controlling fraud and providing enhancements to security and privacy by using a personal hybrid card for a verification process, that includes identity authentication and eligibility verification.

The method includes using a personal hybrid card and a verification process for controlling and eliminating fraudulent access and use of private programs, public programs, government programs, services, benefits, funds, facilities, secured areas, secured entries, and combinations thereof. The method includes registering personal information of an individual in a database and forming a registered account for the individual. Next, the method includes assigning a personal hybrid card to the individual with the registered account.

The personal hybrid card can include a data storage located in an embedded chip, a magnetic stripe, a barcode, or combinations thereof, for storing a copy of the personal information of the registered individual. The personal information, that can be stored on the personal hybrid card, can include: a first biometric data, a personal identification number code, an electronic signature, a biometric signature, an individual's digital photo, an individual's electro-biometric signature, an individual's biometric digital image, a personal data, and combinations thereof.

The method for controlling fraud can continue by verifying at an access point that the individual with the personal hybrid card matches the first biometric data stored on the personal hybrid card by: reading the personal information including the first biometric data stored on the personal hybrid card using a processor in communication with the access point, obtaining a second biometric data on the individual with the personal hybrid card at the access point with a biometric device, and comparing the first biometric data to the second biometric data by using the processor to verify that the first biometric data and the second biometric data are identical.

If the first and second biometric data are not identical, then the identity of the individual at the access point, or at a first point in time, is not verified, and the individual is denied the use of the personal hybrid card, which provides security and privacy of use to the correct or appropriate personal hybrid card holder. The correct or appropriate personal hybrid card holder is the individual that is registered to the personal hybrid card. In an embodiment, the individual can be detained at the point of access to allow for additional personal information to be obtained on the individual for the purpose of authenticating the identity of the individual as the proper individual registered for use of the personal hybrid card.

If the first biometric data and the second biometric data are identical, then the individual's identity is authenticated as being the proper individual registered to the personal hybrid card, who is the appropriate or correct personal hybrid card holder, and the method continues.

Next, the individual's personal information can be transmitted as a first transmission from the access point to the database for requesting verification for identity authentication of the individual to use the personal hybrid card, which is a request for eligibility to use the personal hybrid card.

Then, a second transmission for receiving eligibility verification or denial of the individual to use the personal hybrid card for accessing private programs, public programs, services, benefits, funds, facilities, secured areas, secured entries, and combinations thereof, can be sent from the database to the access point.

The method can include updating the personal information of the individual and information on the use of the personal hybrid card by the individual by transmitting, in a third transmission, from the access point to the database. The third transmission includes information that the individual has engaged the access point for updating the personal information of the individual and the use of the personal hybrid card in the database.

Woven throughout the method is security and privacy regarding registration, ownership, and use of the personal hybrid card as a direct result of fraud control.

BRIEF DESCRIPTION OF THE DRAWINGS

The detailed description will be better understood in conjunction with the accompanying drawings as follows.

Figure 1:
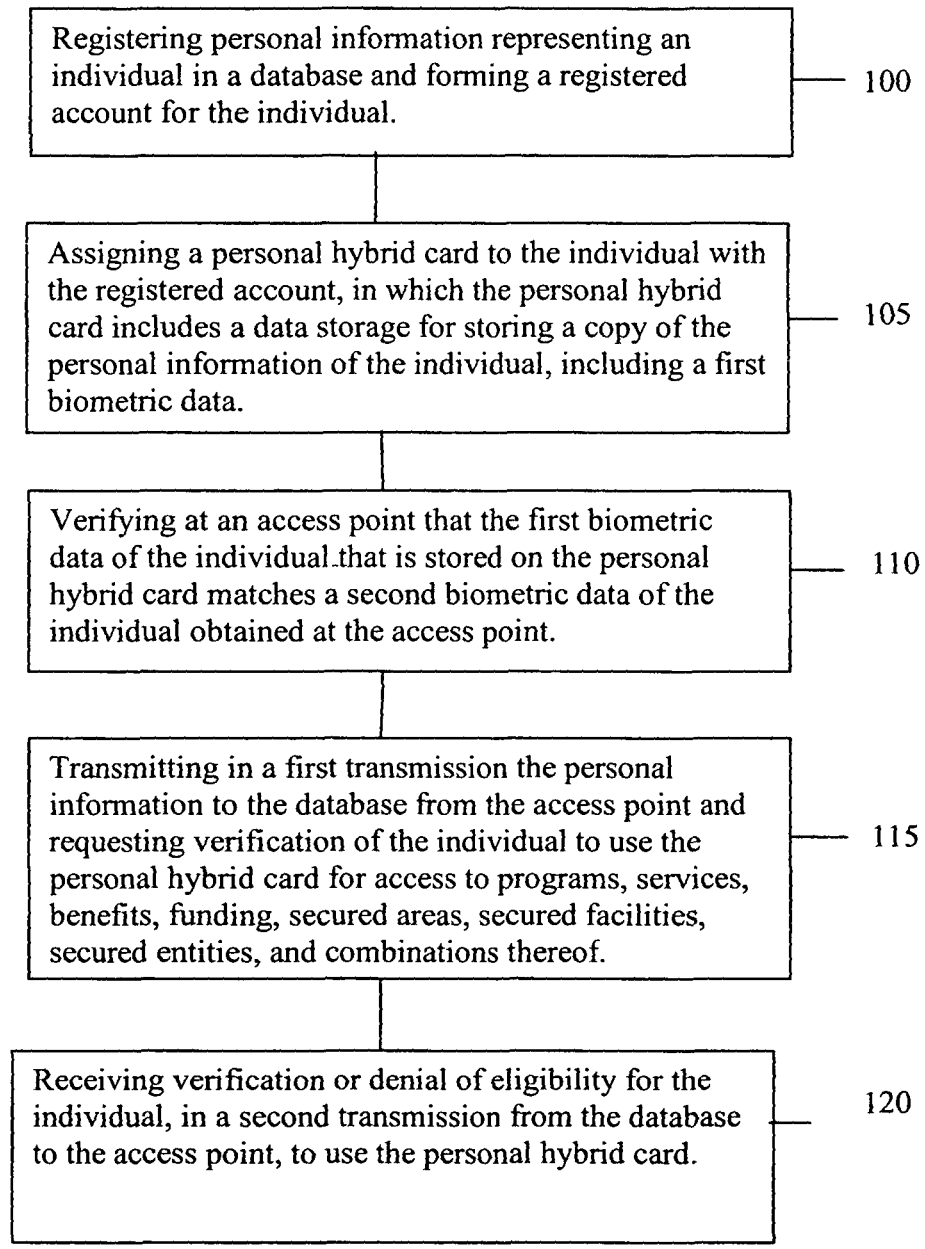
FIG. 1 depicts a flowchart of an embodiment of a method for controlling fraud by using a personal hybrid card for a verification process.

The embodiments are detailed below with reference to the listed Figures.

DETAILED DESCRIPTION OF THE EMBODIMENTS

Before explaining the embodiments in detail, it is to be understood that the embodiments are not limited to the particular embodiments, and that they can be practiced or carried out in various ways.

The embodiments relate generally to a method for controlling fraud and enhancing security and privacy by using a personal hybrid card for a verification process that includes identity authentication and eligibility verification for accessing programs, services, benefits, secured facilities, secured areas, secured entries, and combinations thereof.

The embodiments of the method provide the benefits of controlling and eliminating fraudulent access and use of private programs, public programs, services, benefits, funding, secured areas, secured facilities, and secured entries by using a personal hybrid card for a verification process involving an individual's identity authentication and the individual's eligibility to use the personal hybrid card for accessing the public programs, private programs, services, benefits, funding, secured areas, secured facilities, secured entries, and combinations thereof. The individual can be a person or an entity, wherein an entity can be, for example, a company, a group of persons, a corporation, an institution, a business, an organization, an agency, and combinations thereof.

The embodiments of the method provide the benefits of enhancing security and privacy in using an individual's personal hybrid card for accessing programs, services, benefits, funding, secured areas, secured facilities, secured entries, and combinations thereof. Enhancements to security and privacy protect the individual's personal information and provide freedom from any unauthorized use of the personal hybrid card registered to the individual or intrusion into the individual's personal information; including the individual's biometric information stored on the personal hybrid card.

Other benefits of the method include the capability of storing large amounts of personal information on the personal hybrid card and the affect of reducing magnitudes of costs involved in reviewing and determining requests for access or use of a private or public program, a benefit, a service, a facility, or a secured area, as well as reducing the costs for reviewing and adjudication of any funding or payment requests that result from the services and benefits provided. Another benefit can be to reduce the rate of increase of governmental and private costs for providing security for an area or a facility.

The embodiments of the method for controlling fraud, using a personal hybrid card and a verification process for authenticating identity and verifying eligibility, include the steps of registering personal information on an individual, including a first biometric data representing the individual, in a database forming a registered account for the individual. Next, a personal hybrid card can be assigned to the individual with the registered account.

A registered account for the individual can include a record or a statement of entries for the particular individual that covers any transactions involving the use of the personal hybrid card registered to the particular individual, and can include the transactions during a particular period of time.

The personal hybrid card can be a plastic card, a solid, or a laminate structure, which includes a processor with memory or a data storage for storing a copy of the personal information of the individual. The personal information of the individual includes the initial or "the first" biometric data of the individual that is stored in the data storage at the time the card is personalized to the individual. The data storage can be located on the personal hybrid card in a chip, a magnetic stripe, a bar code, or combinations thereof. For example, the chip can be a computer chip that is embedded in the personal hybrid card for storing personal information of the individual in the data storage or memory of the chip. The personal hybrid card can include a combination of an embedded computer chip and the bar code, the embedded computer chip and the magnetic stripe, the magnetic stripe and the bar code, a combination of computer chips, or other combinations for storing personal information. The combinations for storing large amounts of personal information enable a single personal hybrid card to be used for a range of single to multiple programs, services, benefits, funding, entries, accesses, transactions, or combinations thereof. These combinations have not heretofor been available for simultaneous use.

The chip located in the personal hybrid card includes a processor with a memory and additional data storage for storing personal information. The processor can connect to a biometric device, that is a biometric reader or biometric scanner, or other personal hybrid card reader via an interface, such as a graphical user interface (GUI), for reading the individual's personal information that is stored on the personal hybrid card.

The personal hybrid card can store such personal information as a copy of: a first biometric data from a time when the personal hybrid card is assigned to an individual, a personal identification number code, an electronic signature, a biometric signature, an individual's digital photo, an individual's scanned analog photo, an individual's electro-biometric signature, an individual's biometric digital image, additional personal data, and combinations thereof.

Examples of personal data of an individual include: an individual's name, an individual's address, an individual's phone number, a government issued number, an individual's social security number, a government security clearance code, a government issued status, a military status, a citizenship information, a passport number, a racial background, a country of origin, a voluntary emergency contact person's name, voluntary health information, an individual's health insurance information, an emergency contact medical physician, a primary medical provider name, an individual's date of birth, an individual's place of birth, an individual's height, an individual's weight, an individual's hair color, an individual's occupation, an individual's account information, an individual's criminal record, an individual's child support payment/nonpayment information, an individual's foreign student information, and combinations thereof.

The copy of personal information that is stored on the personal hybrid card can be a portion of the personal data that is stored in a database, or the personal information stored on the personal hybrid card can be an entirety of the personal information that is stored in the database, in which the database serves as an authorizing database for an individual's eligibility regarding use of the personal hybrid card.

The next steps of the method include verifying at an access point that the individual with the personal hybrid card matches the first biometric data stored on the personal hybrid card.

An access point for the method can include a location for permitting access to a facility, program, benefit, or service, such as: a service provider controlled access, a security guard gate-controlled entry, a security guard checkpoint access, a police controlled secured area entry, a patrol officer controlled border entry, a technology controlled transaction entry, an employee controlled entry, a customs officer controlled entry, a security controlled airport entry, an authorizing provider controlled funding access, a computer controlled access, a technology controlled facility access, other access points, and combinations thereof.

The access point provides access to public programs and private programs, such as: healthcare programs, security access protected programs for secured areas, government funding programs, voter registration programs, state human services programs, federal human services programs, city human services programs, county human services programs, educational institutional programs, state employment programs, federal employment programs, authorized funding provider programs, private membership programs, insurance benefits programs, secured-access banking programs, secured-access service programs, secured-access benefits programs, and combinations thereof.

Other examples of an access point include the access to secured areas, such as the Pentagon, an airport, an institution, a facility, a computer program, and other secured areas. For example, a school system can use biometric scanning at an access point to the school to enhance security protection for the children at the school and to prevent fraudulent access, to and from, the school. The biometric scanning is used to identify adults who enter and exit the school and who have the potential to come in contact with the children at the school, such as a routine delivery person. A school representative can scan, for example, the delivery person's finger or eye, and store the fingerprint or iris pattern on a personal hybrid card that the school issues to the delivery person. Next, when the delivery person returns to the school's access point, a second biometric reading of the delivery person's finger or iris can be obtained, using a biometric scanner or biometric reader at the access point, and compared to the fingerprint or iris pattern that is stored on the delivery person's personal hybrid card for identity authentication of the delivery person for accessing the school. Then, using a processor in communication with the school's access point, transmissions to and from the school's database can be made from the access point to verify eligibility of the delivery person to use his/her personal hybrid card for accessing the school.

Examples of access points regarding private programs and private service programs include: access to a level of private funding, a secured access to a corporate membership, access to an authorized insurance benefit service program, access to a private healthcare service program, access to a private facility program, access to a private employment program, and other secured private service programs.

To verify at the access point that the individual with the personal hybrid card matches the first biometric data stored on the personal hybrid card, the method includes the steps of reading the personal information of the individual stored on the personal hybrid card, which includes reading the first biometric data stored on the personal hybrid card by using a processor in communication with the access point.

Next, the method includes the step of obtaining a second biometric data on the individual with the personal hybrid card at the access point by using a biometric device, such as a biometric reader, a biometric scanner, or combinations thereof.

Examples of the biometric reader or the biometric scanner include: a fingerprint reader, a numerical code reader, a voice pattern recognition reader, a retinal scanner, an iris scanner, a telemetry card reader, a bar code reader, a Deoxyribonucleic Acid (DNA) reader, a palm reader, a facial recognition reader, a vein reader, other biometric readers, other biometric scanners, digital video cameras, digital cameras, analog cameras, and combinations thereof.

The first biometric data and the second biometric data of the individual can include an individual's fingerprint, an individual's electro-biometric signature, an individual's facial pattern, an individual's vein, an individual's retina, an individual's iris, an individual's palm, an individual's voice, and other biometrics of the individual.

Next, in an embodiment of the method, the first biometric data can be compared to the second biometric data to verify that the first biometric data and the second biometric data are identical. The scanning and reading of the biometric data at the access point for comparison can be obtained in real-time, which provides instantaneous and simultaneous matching of the first biometric data to the second biometric data and at a moment in time when the individual presents the personal hybrid card for identity authentication.

If the first biometric data and the second biometric data are identical, then the identity of the individual with the personal hybrid card at the access point is authenticated as the individual who was registered for use of the personal hybrid card, and as the individual who is the appropriate or correct personal hybrid card holder.

If the first and second biometric data are not identical, then the identity of the individual at the access point is not verified, and the individual is denied the use of the personal hybrid card. In an embodiment, the individual can be detained at the access point to allow for additional personal information to be obtained on the individual for the purpose of authenticating the identity of the individual as the appropriate or correct individual registered for use of the personal hybrid card.

Alternatively, authenticating the identity of the individual for fraud management can include: scanning and transmitting an individual's biometric data that is stored on the individual's personal hybrid card, scanning and transmitting a cardless biometric data of an individual, scanning and transmitting a cardless personal data of an individual, photographing a cardless biometric data of an individual, scanning and transmitting a contactless biometric data of an individual, scanning and transmitting a contactless personal data of an individual, scanning and transmitting a biometric data of an individual within close proximity of the access point, and combinations thereof.

Then, the steps of the method continue by transmitting, in a first transmission, the personal information to the database from the access point and requesting verification for identity authentication of the individual to use the personal hybrid card, to prevent fraud when using the personal hybrid card, for access to activities, that include: personal identity needs, security needs, service needs, benefits needs, employment needs, professional needs, other personal access needs, other personal entry needs, and combinations thereof.

The embodiments of the method include an access point that includes a processor with a memory and a graphical user interface (GUI) for enabling transmissions to and from a database. The memory includes computer instructions that instruct the processor to form an internet query, an e-mail query, a network query, a comparative information transfer, a transmission of information, other system query, and combinations thereof.

The embodiments of the method include a first transmission that can be facilitated by a registered entity. The registered entity can include: adults, children, employees, students, passengers, travelers, visitors, patients, attendees, individuals entering and exiting country borders, individuals entering and exiting state borders, registered program participants, other registered entities, and combinations thereof.

Next, the personal information that is stored on the personal hybrid card is compared to the personal information in the database by using the processor for determining eligibility of the individual for using the personal hybrid card to access public programs, private programs, security programs, funding programs, services, benefits, secured areas, secured facilities, secured entries, and combinations thereof.

Examples of a facility can include: a building, a bank, a computer program, an airport, a train, an airplane, a truck, a military vehicle, a car, a stadium, an office, an open secured space, a specified area, a computer, a border of a country, a border of a state, an internal country checkpoint, a specified area proximal to a secured building such as a secured parking lot or garage to a secured building, and combinations thereof.

A secured area can be included within a facility as a specified space having a secured access and secured exit, to and from, the space. For example, a building can have an office or a laboratory located within the building as a secured area within a secured facility. The office or laboratory can have a level of security for accessing and exiting the office or laboratory, that is at a higher level of security than the level of security for accessing and exiting the remainder of the building.

The embodiments of the method include access points at secured entries. Examples of secured entries can include: secured computer program entries, secured public program entries, gate-controlled entries to buildings, security guard controlled entries to checkpoints, border patrol officer controlled entries to a country, entries to secured on-line transactions, other secured technology controlled entries, and combinations thereof.

The embodiments of the method include a database that can be a publicly-owned database, a government-owned database, a privately-owned database, or combinations thereof. The database can be a computer database for accessing information in real-time. For example, the database can include: a United States (U.S.) Central Intelligence Agency (CIA) database, a U.S. Federal Bureau of Investigation (FBI) database, a city agency database, a county agency database, a state agency database, a federal agency database, an Immigration and Naturalization database, a U.S. Border Patrol database, a U.S. police database, an Interpol database, a private business database, a state institution database, a state driver's license database, a voter registration bureau database, a professional licensure database, an Internal Revenue Service database, an educational institution database, a state human service agency database, a federal human service agency database, a county human service agency database, a city human service agency database, a drug enforcement agency database, a social security agency database, a hospital database, an insurance database, a service provider database, an airline database, an authorizing provider database, a banking database, and combinations thereof.

Then, a second transmission is received by the access point from the database regarding eligibility verification or denial of the individual to use the personal hybrid card for accessing services, benefits, programs, secured areas, secured facilities, secured entries, and combinations thereof, to address the individual's needs.

The second transmission from the database to the access point provides the required eligibility verification of the individual to prevent fraudulent use of the personal hybrid card and can be accomplished in real-time, while the individual is at the access point.

The personal hybrid card can be used for controlling fraud with regard to such individual's needs as biometric security compliance for: accessing a secured area, a computer program, a public or private service, a facility, and correcting an on-line transaction, such as an automatic transmission or an update.

Further, the personal hybrid card can be used for controlling fraud as a direct result of personal information privacy and security for access to a patient's on-line health history, an individual's payment histories, an individual's or a group of individuals' funding, an individual's or a group of individuals' insurance benefits, and other programs and services.

The embodiments of the method enable the transfer of information to be facilitated on-line between the database and the access point, and the database and the individual with the personal hybrid card at the access point, by using a network, such as a cable network, a wireless network, a fiber optic network, a satellite network, a radio proximity network, and combinations thereof. Examples of networks that can be used in the method include: an Internet network, a wide area network (WAN), a local area network (LAN), an Intranet, a private area network, and combinations thereof.

The steps of the method for controlling fraud, as a direct result of providing security and privacy, can include further updating the personal information of the individual and the information regarding the eligibility and actual use of the personal hybrid card by transmitting, in a third transmission, from the access point to the database that the individual has engaged the access point for updating the personal information on the individual or the use of the personal hybrid card.

For example, an individual who is employed in a highly secured facility, such as the Pentagon, must be registered with the Pentagon's database for accessing the building and issued a personal hybrid card for use in accessing the Pentagon and the secured areas within or around the Pentagon, for which the individual is approved for access. The individual's personal hybrid card contains a copy of the individual's personal information stored on a chip and magnetic stripe or bar code located on the personal hybrid card. A copy of the individual's biometric data, such as a fingerprint or retinal scan, is also stored on a chip, that is embedded in the personal hybrid card, for scanning and reading at an access point of entry to the Pentagon and other highly secured areas within or around the Pentagon.

At the access point to the Pentagon, the individual presents his/her personal hybrid card for reading. Then, the individual's finger or eye is scanned and compared to the fingerprint or retinal pattern information, respectively, that is stored on the personal hybrid card. If the fingerprint or retinal pattern information that is stored on the personal hybrid card is identical to the fingerprint or retinal pattern of the individual with the personal hybrid card who is at the access point to the Pentagon, then the identity of the individual is authenticated as the individual correctly registered for using the personal hybrid card and accessing the Pentagon.

Next, a first transmission from the access point to the Pentagon database, is sent by using a processor in communication with the access point, to request verification of the individual's eligibility to use the personal hybrid card. Then, a second transmission from the Pentagon database to the access point is transmitted in real-time, while the individual is at the access point, and provides information that the individual is currently employed at the Pentagon; and accordingly, the individual is eligible to use the personal hybrid card to access the Pentagon for performing employment work.

An embodiment of the method includes the individual presenting his/her personal hybrid card at the access point, which is also the exit point, for exiting the Pentagon. The individual presents his/her personal hybrid card for scanning and reading of the individual's personal information and the individual's fingerprint or retinal pattern as stored on the personal hybrid card. Then, the individual's finger or retina is scanned and compared to the fingerprint or retinal pattern that is stored on the personal hybrid card. If the fingerprint or retinal pattern information stored on the personal hybrid card is identical to the individual's scanned fingerprint or retinal pattern, as scanned at the access point, then the individual's identity is authenticated as the correct individual for using the personal hybrid card to exit the Pentagon building. Further, a first transmission from the access point to the Pentagon database and a second transmission from the database to the access point can verify eligibility of the individual for use of the personal hybrid card for exiting the Pentagon. Then, after the individual exists the Pentagon building, a third transmission can be sent from the access point to the Pentagon database to provide the updated information on the individual and the use of the personal hybrid card by the individual in accessing the Pentagon building, including the date, time, and location of each entry and exit.

With regard to the Figures, FIG. 1 depicts a flowchart of an embodiment of a method for controlling fraud by using a personal hybrid card.

The steps of the method include registering personal information, including a first biometric data representing an individual in a database forming a registered account for the individual (Step 100). The next step includes assigning a personal hybrid card to the individual with the registered account, wherein the personal hybrid card includes a data storage for storing a copy of the personal information on the individual, including the first biometric data (Step 105).

Then, the method continues by verifying at an access point that the first biometric data of the individual, that is stored on the personal hybrid card, matches a second biometric data of the individual, that is obtained at the point of access by using a biometric device (Step 110).

The next steps of the method include transmitting, in a first transmission, the personal information to the database from the access point and requesting verification of the individual to use the personal hybrid card for accessing programs, services, benefits, facilities and secured areas regarding personal identity needs, security needs, service needs, benefits needs, public program needs, private program needs, other personal access needs, and combinations thereof (Step 115).

Then, the method includes receiving verification or denial of the individual in a second transmission from the database to the access point for verifying eligibility to use the personal card, which can be accomplished in real-time. The personal hybrid card can be used for accessing programs, services, benefits, funding, secured areas, secured facilities, secured entries, and combinations thereof (Step 120).

Figure 2:
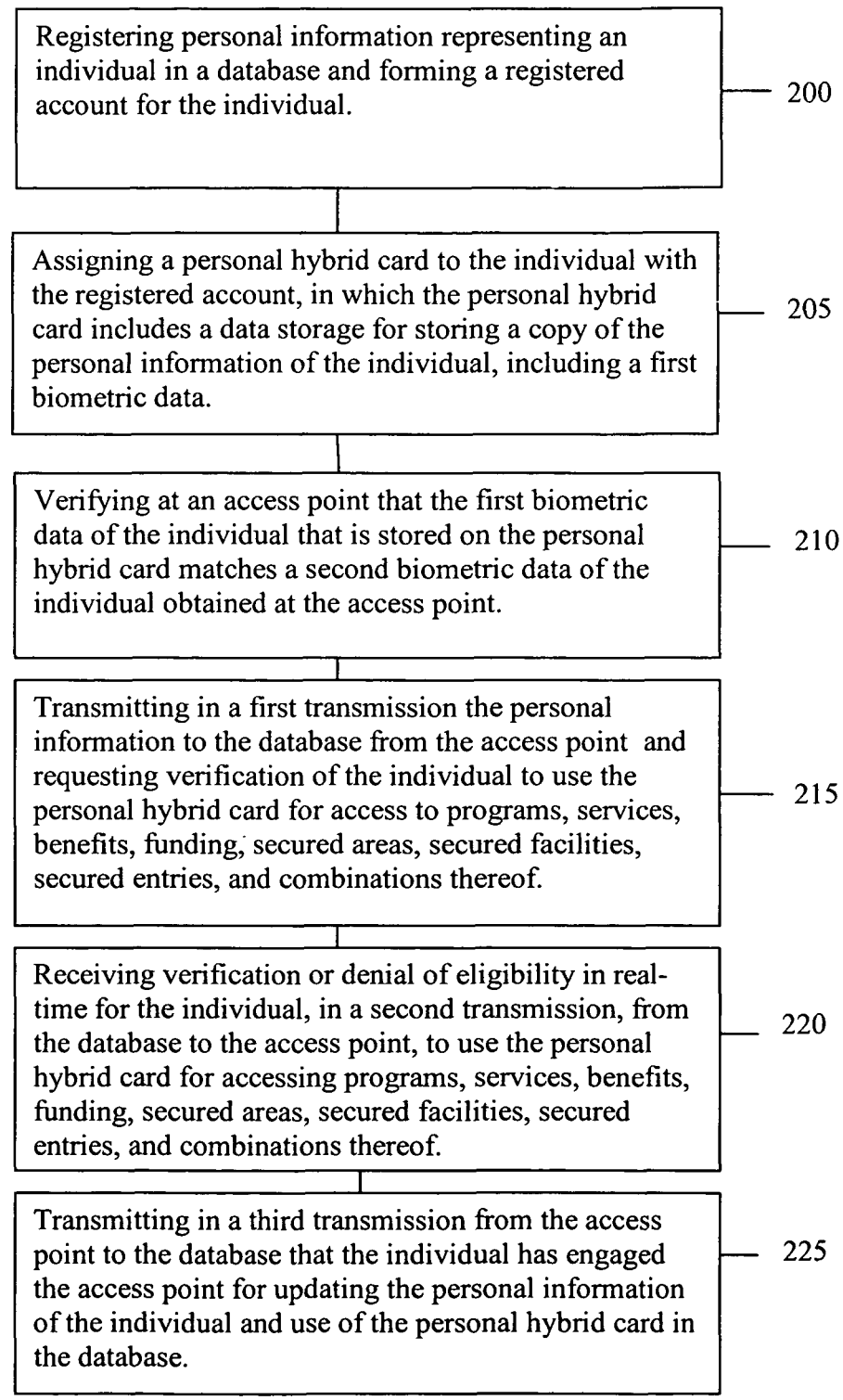
FIG. 2 depicts a flowchart of an embodiment of a method for controlling fraud by using a personal hybrid card for a verification process with updating of personal information on an individual and use of the personal hybrid card to a database.

FIG. 2 depicts a flowchart of an embodiment of a method for controlling fraud and enhancing security and privacy by using a personal hybrid card with an updating of the personal information to the database.

The steps of the method include registering personal information, including a first biometric data representing an individual in a database and forming a registered account for the individual (Step 200). The next step includes assigning a personal hybrid card to the individual with the registered account, wherein the personal hybrid card includes a data storage for storing a copy of the personal information on the individual which includes the first biometric data representing the individual (Step 205).

The method continues by verifying at an access point that the first biometric data of the individual, which is stored on the personal hybrid card, matches a second biometric data of the individual, which is obtained at the access point by using a biometric device, such as a biometric reader or biometric scanner (Step 210). A processor in communication with the access point is used for reading the first biometric data and for comparing the first biometric data to the second biometric data.

The next steps of the method include transmitting, in a first transmission, the personal information to the database from the access point and requesting verification of the individual to use the personal hybrid card for accessing programs, services, benefits, facilities, and secured areas regarding personal identity needs, security needs, service needs, benefits needs, public program needs, private program needs, personal access needs, personal entry needs, and combinations thereof (Step 215).

Next, the method includes receiving verification or denial of the individual, in a second transmission from the database to the access point, for verifying eligibility to use the personal card, which can be accomplished in real-time. The personal hybrid card can be used for accessing programs, services, benefits, funding, secured areas, secured facilities, secured entries, and combinations thereof (Step 220).

Then, the method includes transmitting in a third transmission from the access point to the database that the individual has engaged the access point for updating the personal information of the individual and the use of the personal hybrid card in the database (Step 225).

While these embodiments have been described with emphasis on the embodiments, it should be understood that within the scope of the appended claims, the embodiments might be practiced other than as specifically described herein.

What is claimed is:

1. A method for controlling fraud and enhancing security and privacy by using a personal hybrid card for a verification process, wherein the steps of the method comprise:
   a. registering personal information including a first biometric data and an electro-biometric signature representing an individual in a database and forming a registered account for the individual;
   b. assigning a personal hybrid card to the individual with the registered account, wherein the personal hybrid card comprises combinations of technologies comprising a computer processor and a data storage for storing a copy of the personal information comprising the first biometric data and an electro-biometric signature stored in the data storage, wherein the combinations of technologies comprise a member selected from the group consisting of: a computer chip and a magnetic strip, a computer chip and a barcode, a computer chip and other technology, and other combinations of technologies for storing personal information and a program data on the personal hybrid card;
   c. performing an identity authentication comprising: verifying at an access point that the individual with the personal hybrid card matches the first biometric data stored on the personal hybrid card, wherein the verifying comprises the steps of:

i. reading the personal information including the first biometric data stored on the personal hybrid card using the computer processor of the personal hybrid card;

ii. obtaining a second biometric data on the individual at or within a proximity of the access point with the computer processor, wherein the computer processor is in communication with a biometric reader for reading the second biometric data;

iii. comparing the first biometric data to the second biometric data using the computer processor of the personal hybrid card to verify that the first biometric data and the second biometric data are identical; and iv. obtaining additional personal information and an electro-biometric signature from informational databases for comparing the additional personal information and the electro-biometric signature to the personal information and the electro-biometric data stored on the personal hybrid card and to the electro-biometric data of the individual for identity authentication; and d. performing an eligibility verification comprising: transmitting in a first transmission the personal information comprising the electro-biometric data to the database from the access point and requesting verification of eligibility for the individual to use the personal hybrid card for determining access to levels of activities comprising personal identity needs, security needs, service needs, benefit needs, and personal access needs, wherein the verification of eligibility is based on the personal information comprising the electro-biometric data of the first transmission and corresponding personal information associated with the registered account; and e. receiving eligibility verification or denial of the individual as a second transmission to use the personal hybrid card for determining access to specific levels of activities thereby preventing fraud and enhancing security and privacy for access to a specific level or defined service, benefit, program, secured facility, secured area, and secured entry; and f. updating the personal information of the individual by transmitting in a third transmission from the access point to the database that the individual has engaged the access point for updating the personal information of the individual and updating information about the use of the personal hybrid card in the database for determining a secured exit from the access point by the cardholder.

2. The method of claim 1, wherein the personal information stored on the personal hybrid card is compared to the personal information in the database using the processor in communication with a network, wherein the processor is stored on the personal hybrid card for transmitting, receiving, and comparing personal information, the processor is located at the access point, or combinations thereof.

3. The method of claim 1, wherein the personal information comprises a first biometric data, a second biometric data, a third biometric data, a personal identification number code, an electronic signature, a biometric signature, an individual's digital photo, an individual's biometric digital image, an individual's electro-biometric signature, and a personal data.

4. The method of claim 1, wherein the personal data of the individual comprises a member selected from the group consisting of:
a. an individual's name;
b. an individual's address;
c. an individual's phone number;
d. a government issued number;
e. an individual's social security number;
f. a government security clearance code;
g. a government issued status;
h. a military status;
i. a citizenship information;
j. a passport number;
k. a racial background;
l. a country of origin;
m. a voluntary emergency contact person's name;
n. voluntary health information;
o. an individual's health insurance information;
p. an emergency contact medical physician;
q. a primary medical provider name;
r. an individual's date of birth;
s. an individual's place of birth;
t. an individual's height;
u. an individual's weight;
v. an individual's hair color;
w. an individual's occupation;
x. an individual's account information;
y. an individual's criminal record information;
z. an individual's child support payment/nonpayment information; and
aa. an individual's foreign student information; and
bb. combinations thereof.

5. The method of claim 1, wherein the copy of personal information is a portion of the personal data stored in the database or an entirety of the personal information stored in the database.

6. The method of claim 1, wherein the data storage positioned on the personal hybrid card is located within a member selected from the group consisting of a chip, a magnetic strip, a bar code, other technology, and combinations thereof.

7. The method of claim 6, wherein the chip comprises a processor with a memory, and wherein the processor is connected with an interface to a biometric device.

8. The method of claim 1, wherein the access point comprises: a processor with a memory and a graphical user interface, wherein the memory comprises computer instructions to instruct the processor to form a member selected from the group consisting of: an internet query, and e-mail query, a network query, a comparative information transfer, a transmission of information, other system query, and combinations thereof.

9. The method of claim 1, wherein the access point provides scanning or reading at a moment in time when the individual presents the personal hybrid card for identity authentication of the individual.

10. The method of claim 9, wherein the access point provides instantaneous and simultaneous matching of the first biometric with the second biometric data.

11. The method of claim 1, wherein the method facilitates the transfer of information between the database and the individual with the personal hybrid card on-line using a network that can be a member selected from the group consisting of: a cable network, a wireless network, a fiber optic network, a satellite network, a radio proximity network, and combinations thereof.

12. The method of claim 11, wherein the network comprises a member selected from the group consisting of: an Internet network, a wide area network (WAN), a local area network (LAN), an Intranet, a private area network, and combinations thereof.

13. The method of claim 1, wherein the access point provides access to public programs and private programs comprising a member selected from the group consisting of: healthcare programs, security access protected programs for secured areas, government funding programs, voter registration programs, state human services programs, federal human services programs, city human services programs, county human services programs, educational institution programs, state employment programs, federal employment programs, authorized funding provider programs, private membership programs, insurance benefits programs, secured-access banking programs, secured-access service programs, secured-access benefits programs, and combinations thereof.

14. The method of claim 1, wherein the access point comprises a member selected from the group consisting of: a service provider controlled access, a security guard gate-controlled entry, a security guard checkpoint access, a police controlled secured area entry, a patrol officer controlled border entry, a computer controlled access, an employee controlled entry, a customs officer controlled entry, a security controlled airport entry, an authorizing provider controlled funding access, a technology controlled facility access, a technology controlled transaction entry, and combinations thereof.

15. The method of claim 1, wherein the step of authenticating identity of the individual with the personal hybrid card comprises using a member selected from the group consisting of: a fingerprint reader, a numerical code reader, a voice pattern recognition reader, a retinal scanner, an iris scanner, a telemetry card reader, a bar code reader, a Deoxyribonucleic Acid (DNA) reader, a palm reader, a facial recognition reader, a vein reader, other biometric readers, other biometric scanners, digital video cameras, digital cameras, and combinations thereof.

16. The method of claim 1, wherein the method is used for fraud management by authenticating an identity of the individual, wherein the step of authenticating the identity of the individual further comprises a member selected from the group consisting of: scanning and transmitting an individual's biometric data stored on the individual's personal hybrid card, scanning and transmitting a cardless biometric data of the individual, scanning and transmitting a cardless personal data of the individual, photographing a cardless biometric data of the individual, scanning and transmitting a contactless biometric data of the individual, scanning and transmitting a contactless personal data of the individual, scanning and transmitting a biometric data of the individual within close proximity of the access point, and combinations thereof.

17. The method of claim 1, wherein the first transmission is facilitated by a registered entity comprising a member selected from the group consisting of: adults, children, employees, students, passengers, travelers, visitors, patients, attendees, individuals entering and exiting at state borders, individuals entering and exiting at country borders, registered program participants, and combinations thereof.

18. The method of claim 1, wherein the database is a publicly-owned database, a government-owned database, a privately-owned database, or a combination thereof.

19. The method of claim 1, wherein the database comprises a member selected from the group consisting of: a United States (U.S.) Central Intelligence Agency (CIA) database, a U.S. Federal Bureau of Investigation (FBI) database, a city agency database, a county agency database, a state agency database, a federal agency database, an Immigration and Naturalization database, a U.S. Border Patrol database, a U.S. police database, an Interpol database, a private business database, a state institution database, a state driver's license database, a voter registration bureau database, a professional licensure database, an Internal Revenue Service database, an educational institution database, a state human service agency database, a federal human service agency database, a county human service agency database, a city human service agency database, a drug enforcement agency database, a social security agency database, a hospital database, an insurance database, a service provider database, an airline database, an employment agency database, an authorizing provider database, a banking database, and combinations thereof.

20. The method of claim 1, wherein the individual is a member selected from the group consisting of: a person, a company, a group of persons, a corporation, an institution, a business, an organization, an agency, and combinations thereof.

21. The method of claim 1, further comprising the step of sending additional transmissions to and from a database to receive additional personal information including additional biometric data on the individual for authenticating identity and for determining and verifying eligibility.

22. A method for enhancing security and privacy by using a personal hybrid card for a verification process, wherein the steps of the method comprise:
   a. registering personal information including a first biometric data and an electro-biometric data representing an individual in a database and forming a registered account for the individual;
   b. assigning a personal hybrid card to the individual with the registered account, wherein the personal hybrid card comprises combinations of technologies comprising a data storage for storing a copy of the personal information comprising the first biometric data and an electro-biometric data stored in the data storage, wherein the combinations of technologies comprise a member selected from the group consisting of: a computer chip and a magnetic strip, a computer chip and a barcode, a computer chip and other technology, and other combinations of technologies for storing personal information and a program data on the personal hybrid card;
   c. performing an identity authentication process comprising: verifying at an access point that the individual with the personal hybrid card matches the first biometric data stored on the personal hybrid card, wherein the verifying comprises the steps of:
      i. reading the personal information including the first biometric data stored on the personal hybrid card using a processor in communication with the access point;
      ii. obtaining a second biometric data of the individual with the personal hybrid card by using a biometric device;
      iii. comparing the first biometric data to the second biometric data using the processor to verify that the first biometric data and the second biometric data are identical; and
      iv. obtaining additional personal information and an electro-biometric signature from informational databases for comparing the additional personal information and the electro-biometric signature to the personal information and the electro-biometric data stored on the personal hybrid card and to the electro-biometric data of the individual for identity authentication; and
   d. performing an eligibility verification process comprising: transmitting in a first transmission the personal information, comprising the first biometric data and the electro-biometric signature, to the database from the access point and requesting verification of eligibility for the individual to use the personal hybrid card for determining access to levels of activities comprising a member selected from the group consisting of: personal identity needs, security needs, service needs, benefit needs, personal access needs, and combinations thereof, wherein the verification of eligibility is based on a comparison of the personal information of the first transmission, including comprising the first biometric data and the electro-biometric signature, to the corresponding personal information associated with the registered account, and wherein the first transmission of the personal information comprising the first biometric data and the electro-biometric signature, is transmitted from the access point to the database and from the personal hybrid card at the access point to the database for requesting verification of eligibility;

e. receiving eligibility verification or denial of the individual as a second transmission from the database to the access point and the personal hybrid card to use the personal hybrid card for determining access to specific levels of activities thereby preventing fraud and enhancing security and privacy for access to a specific level or defined service, benefit, program, secured facility, secured area, and secured entry; and f. updating the personal information of the individual by transmitting in a third transmission from the access point to the database that the individual has engaged the access point for updating the personal information of the individual and updating information about the use of the personal hybrid card in the database for determining a secured exit from the access point by the cardholder.

* * * * *